(12) United States Patent
Reynolds (10) Patent No.: US 10,632,815 B2
(45) Date of Patent: Apr. 28, 2020

(54) AIR CONDITIONING SYSTEM FOR AN OPEN MOTORIZED VEHICLE

(71) Applicant: B & D Technologies, LLC, Accomac, VA (US)

(72) Inventor: Orvell B. Reynolds, Satsuma, AL (US)

(73) Assignee: B & D Technologies, LLC, Accomac, VA (US)

( * ) Notice: Subject to any disclaimer, the term of this patent is extended or adjusted under 35 U.S.C. 154(b) by 0 days.

(21) Appl. No.: 16/125,009

(22) Filed: Sep. 7, 2018

(65) Prior Publication Data

US 2019/0009637 A1 Jan. 10, 2019

Related U.S. Application Data

(63) Continuation of application No. 14/311,978, filed on Jun. 23, 2014, now Pat. No. 10,259,287.

(60) Provisional application No. 61/847,649, filed on Jul. 18, 2013.

(51) Int. Cl.
*B60H 1/00* (2006.01)

(52) U.S. Cl.
CPC .......... *B60H 1/00407* (2013.01); *B60H 2001/00242* (2013.01)

(58) Field of Classification Search
CPC ........ B60H 1/24; B60H 1/244; B60H 1/3208; B60H 1/3229; B60H 1/00378; B60H 1/00407; B60H 2001/00242
See application file for complete search history.

(56) References Cited

U.S. PATENT DOCUMENTS

| | | | | |
|---|---|---|---|---|
| 3,948,312 A | * | 4/1976 | Nisbet ................ | B60H 1/00064 165/204 |
| 4,828,017 A | * | 5/1989 | Watanabe .............. | B60K 11/04 165/41 |
| 6,261,173 B1 | * | 7/2001 | Odebrecht .......... | B60H 1/00407 165/42 |
| 2006/0006696 A1 | * | 1/2006 | Umemoto .......... | B62D 33/0617 296/190.08 |
| 2006/0102415 A1 | * | 5/2006 | Menebroker .......... | B60K 28/12 180/286 |
| 2009/0038186 A1 | * | 2/2009 | Osswald ................ | B62D 21/14 37/413 |
| 2009/0066052 A1 | * | 3/2009 | Bessho .................. | B60G 9/022 280/124.179 |
| 2012/0205946 A1 | * | 8/2012 | Taylor ...................... | B60S 1/54 296/190.09 |
| 2013/0118708 A1 | * | 5/2013 | Ichikawa ............ | B60H 1/00378 165/59 |

* cited by examiner

*Primary Examiner* — Steven S Anderson, II
(74) *Attorney, Agent, or Firm* — AdamsIP, LLC; J. Hunter Adams; Stephen Thompson (57) ABSTRACT

An air conditioning system for an open motorized vehicle can include a cab assembly defining an interior volume, the cab assembly includes an enclosed frame configured to be attached to an open vehicle, and an air conditioning unit positioned at least partially within the cab assembly, the air conditioning unit being configured to deliver conditioned air to the interior volume of the cab assembly.

4 Claims, 12 Drawing Sheets

FIG. 10

AIR CONDITIONING SYSTEM FOR AN OPEN MOTORIZED VEHICLE

CROSS REFERENCES TO RELATED APPLICATIONS

This application is a continuation of co-pending U.S. patent application Ser. No. 14/311,978 filed Jun. 23, 2014, which claims priority to U.S. Provisional Patent Application Ser. No. 61/847,649 filed Jul. 18, 2013, in which both applications are incorporated herein in their entirety by reference.

FIELD OF THE DISCLOSURE

The present invention relates generally to conditioned air systems, and more particularly, to an air conditioning system for an open motorized vehicle, such as a riding mower.

BACKGROUND

Many Americans spend countless hours maintaining and beautifying their lawns and landscape. As a matter of pride and personal expression, these people manicure their grass, plant and maintain flowers, shrubs, bushes and trees, all for the sake of enhancing the aesthetic qualities of their property. On properties with large areas of grass to cut, riding mowers are very popular. They allow their users to cut relatively large areas of grass in a minimal amount of time while allowing the rider to sit in comfort.

However, the maximum operating time is often limited by how hot the weather is. Since grass is most often cut in the warm summer months, users quickly heat up when sitting exposed in the sun. The user is also exposed to dust, dirt, and pollen which are kicked up by the mower making for a truly miserable experience. Users may have to take frequent breaks just to cool off.

Accordingly, there exists a need for a means by which a riding mower can be operated in hot weather, without the disadvantages as described above.

SUMMARY

The inventor has recognized the aforementioned inherent problems and lack in the art and observed that there remains a need for a means by which an open vehicle can be operated in hot weather. The development of the present invention, which will be described in greater detail herein, substantially departs from conventional solutions to provide an air conditioning system for an open motorized vehicle and in doing so fulfills this need.

In one (1) embodiment, the disclosed air conditioning system for an open motorized vehicle can include a cab assembly defining an interior volume, the cab assembly includes an enclosed frame, and an air conditioning unit positioned at least partially within the cab assembly, the air conditioning unit being configured to deliver conditioned air to the interior volume of the cab assembly.

In another embodiment, the disclosed air conditioning system for an open motorized vehicle can include a cab assembly defining an interior volume, the cab assembly including an upper frame, a lower frame connected to the upper frame, at least a portion of the lower frame is configured to be attached to a frame of an open vehicle, a plurality of panels connected between the upper frame and the lower frame, and a door hingedly attached to the upper frame, an air conditioning unit configured to be attached to the frame of the open vehicle, the air conditioning unit being configured to deliver conditioned air to the interior volume of the cab assembly, a support shelf attached to the frame of the open vehicle adjacent to the air conditioning unit, wherein the air conditioning unit is attached to the support shelf, a transmission mechanical interconnected between the air conditioning unit and an engine of the open vehicle, the transmission being configured to transmit rotary motion of the engine to the air conditioning unit, a fan attached to the frame of the open vehicle adjacent to the air conditioning unit, the fan being configured to direct ambient air into the air conditioning unit, an electrical power connection electrically interconnected between an electrical power source of the open vehicle and the air conditioning unit and the fan, the electrical power connection being configured to draw electrical power from the electrical power source and direct the electrical power to the air conditioning unit and the fan, and a control switch assembly electro-mechanically connected to the air conditioning unit, the transmission, and the fan, the control switch being configured to selectively activate and de-activate the air conditioning unit, the transmission, and the fan.

Furthermore, the described features and advantages of the disclosed air conditioning system for an open motorized vehicle can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY 10 air conditioning system for an open motorized vehicle
20 cab assembly
22 upper frame section
24 front door
25 roof panel
26 door hinge
28 window
30 door latch
32a first side panel
32b second side panel
40 lower frame section
50 air conditioning unit
52 evaporator unit
53 power wiring
54a first fan vent
54b second fan vent
55 evaporator fan
56 fan control knob
57 temperature control knob
58 rear enclosure
59 louver
60 condenser frame
62 grill
63 grill hinge
64 grill latch
65 condenser
66 dryer canister
68 compressor
69 compressor pulley
70 refrigeration hose
72 support shelf
80 fastener
82 cooled air
84 condenser fan
86 condenser fan mounting plate
90 isolation panel
92 drive belt
93a tensioning pulley
93b stationary pulley arm
93c tensioning pulley arm
93d tensioning spring
94 engine pulley
100 lawn mower
110 tire
115 mower deck
120 seat
125 mower roll bar
130 engine cover
135 engine
136 output shaft
137 key
140 mower frame
200 alternate embodiment
210 roll bar
215 foot plate

DETAILED DESCRIPTION

In accordance with the invention, the best mode is presented in terms of the described embodiments, herein depicted within FIGS. 1 through 10. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring to FIGS. 1-10, disclosing an air conditioning system for an open motorized vehicle (herein described as the "system") 10, where like reference numerals represent similar or like parts. The system 10 generally includes a cab assembly 20 and an air conditioning unit 50 connected to an open motorized vehicle. The air conditioning unit 50 can be positioned behind a driver's seat 120. Cooled air 82 produced by the air conditioning unit 50 can be exhausted directly into an area defined by an interior of the cab assembly 20 that is occupied by a user. The cab assembly 20 can help to retain the cooled air 82 as well as reduce the infiltration of dust, dirt, pollen, and/or other contaminants.

Throughout the present disclosure, the disclosed system 10 is described in terms of a specific, non-limiting example as being connected to and/or utilized with a riding lawn mower 100. Those skilled in the art will appreciate that the disclosed system 10, 200 can be connected to and/or utilized with any suitable open motorized vehicle including, but not limited to, a golf cart, an all terrain vehicle, a go cart, a tractor, and the like.

Figure 1:
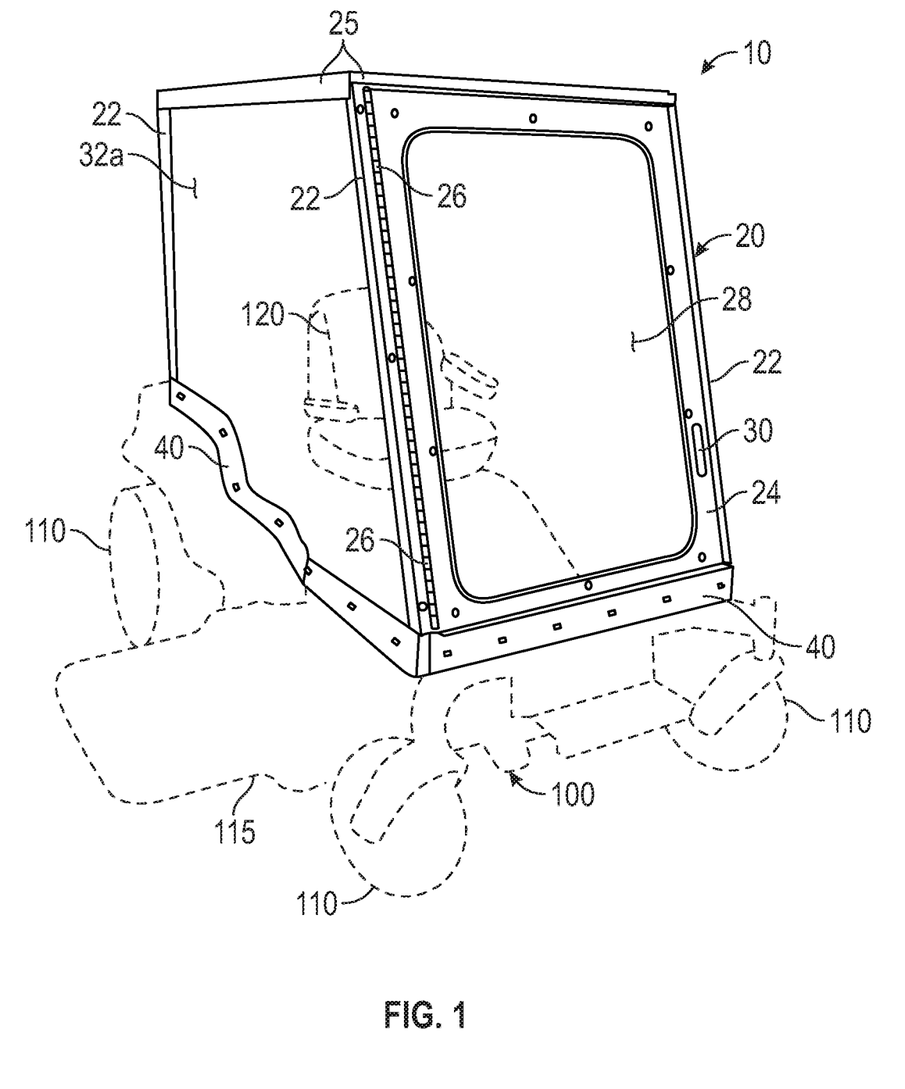
FIG. 1 is an environmental view of one embodiment of the disclosed air conditioning system for an open motorized vehicle according to the present invention.
Figure 2A:
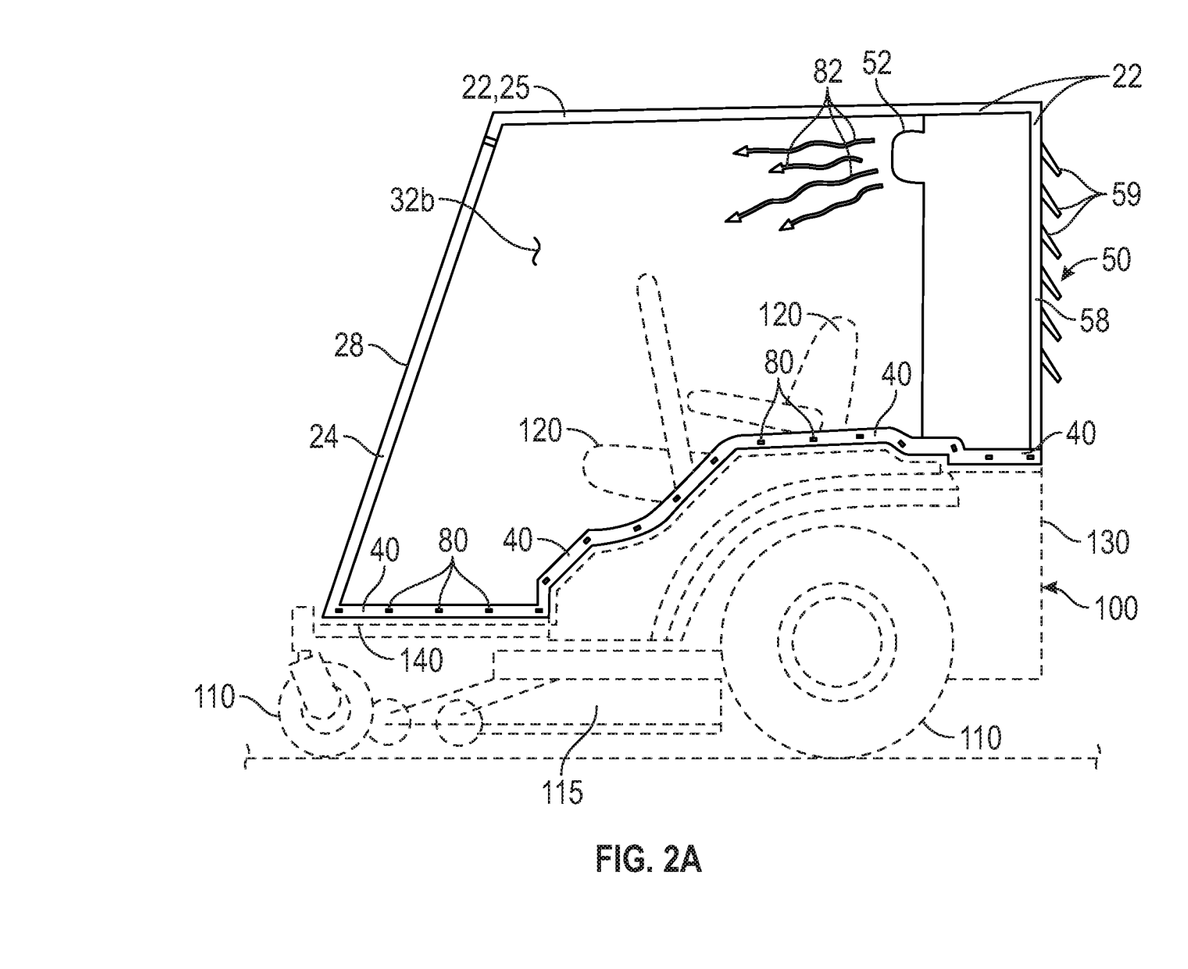
FIG. 2*a* is a left side cut-away environmental view of the disclosed air conditioning system for an open motorized vehicle of FIG. 1.
Figure 2B:
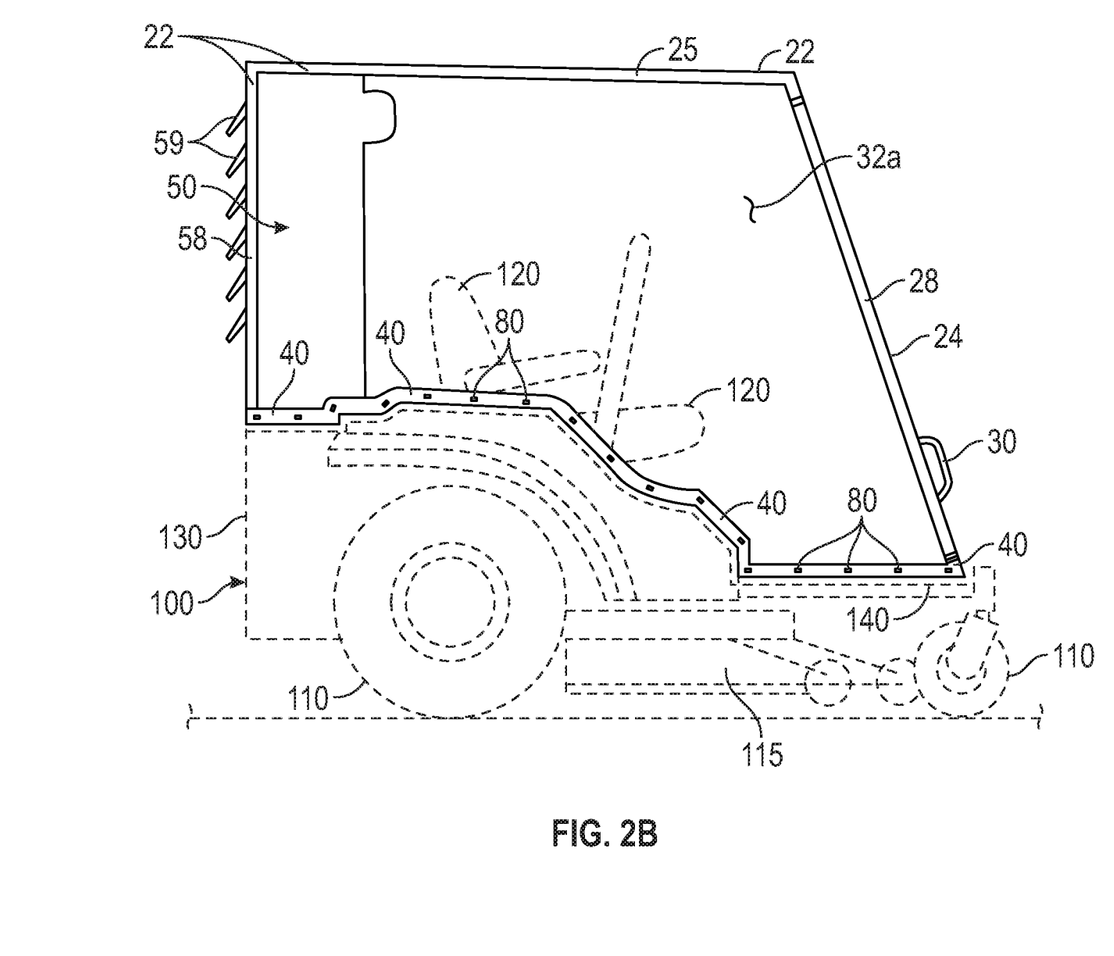
FIG. 2*b* is a right side cut-away environmental view of the disclosed air conditioning system for an open motorized vehicle of FIG. 1.

Referring now to FIGS. 1, 2a, and 2b, the cab assembly 20 includes a closed rectangular structure formed by an upper frame 22 and a lower frame 40, which act as support structures for attachment of a plurality of flat panels. The panels can be made from plastic or metal. The panels can include a hinged front door 24, an opaque roof panel 25, and mirror-image first side panel 32a and second side panel 32b.

The cab assembly 20 can be attached to side frames 140 of the mower 100 about the lower frame 40 of the cab assembly 20 using a plurality of fasteners 80 such as bolts, screws, or the like. The lower frame 40 includes a metal structure being correspondingly shaped to the mower frame 140. For example, the lower frame 40 may utilize sections of flat stock for vertical attachment or utilize angle shapes for horizontal attachment. The lower frame 40 can be fabricated as a welded assembly configured to extend around and be affixed to side and front frames 140 of the lawn mower 100. The upper 22 and lower 40 frames can be fabricated using flat or angled metal stock being bolted together to form a rigid structure onto which the side panels 32a, 32b and door hinge 26 can be mounted.

The front door 24 includes a flat metal panel having a large central window 28 pivotally attached to the upper frame 22 by the hinge 26. The door 24 can be configured to be swung outwardly to enable front entry by the user into the cab assembly 20. For example, the front door 24 can be mounted to opposing and generally parallel front portions of the upper frame 22 via the door hinge 26 using a plurality of fasteners 80 such as screws. The front door 24 can also include a rotary-type door latch 30 along an edge opposite the door hinge 26. The side panels 32a, 32b and window 28 can be made of a durable clear or tinted plastic sheet material such as LEXAN®, PLEXIGLAS®, or the like.

Those skilled in the art will appreciate that the actual dimensions of the cab assembly 20, as well as the size and profile of the lower frame 40, may vary depending upon the size, type, and/or model of lawn mower 100 to enable the cab assembly 20 to be retrofittable to various popular riding lawn mowers 100 by corresponding to respective frames 140 of lawn mowers 100 without deviating from the teachings of the disclosed system 10, and as such should not be interpreted as a limiting factor.

The lawn mower 100 can include conventional and expected features including tires 110, a mower deck 115, a seat 120, a rearwardly positioned mower roll bar 125 (FIG. 4), an engine 135 (FIG. 6a) having an available output shaft 136 (FIG. 8), an engine cover 130, and a structural frame 140.

FIGS. 3, 4, 5, and 6a illustrate various views of the system 10 depicting the air conditioning unit 50. Those skilled in the art will recognize that various portions of the lawn mower 100 and cab assembly 20 (FIG. 1) have been omitted for clarity sake. The air conditioning unit 50 can be configured to provide production and delivery of cooled air 82 upon an occupant of the cab assembly 20 (FIG. 1). The air conditioning unit 50 includes a self-contained system being powered by the output shaft 136 (FIG. 8) of the mower engine 135. The air conditioning unit 50 includes a plurality of standard (e.g., purchased) refrigeration components being interconnected by refrigeration hoses 70. The major components of the air conditioning unit 50 include an evaporator unit 52, a particle filtering grill 62, a condenser 65, a dryer canister 66, a pulley-driven compressor 68, and a condenser fan 84 (FIG. 9). The dryer canister 66 acts to adsorb system contaminants, such as water, and to provide physical filtration. For example, the air conditioning components can be substantially similar to those manufactured and distributed by suppliers such as the NOSTALGIC AIR PARTS, INC.® and other suppliers.

The major components of the air conditioning unit 50 can be mounted to and supported by vertical portions of the lawn mower 100 (e.g., the mower roll bar 125) via various mounting structures such as a condenser fan mounting plate 86, a condenser frame 60, and/or a support shelf 72, which span a gap between the vertical members of the mower roll bar 125.

Figure 3:
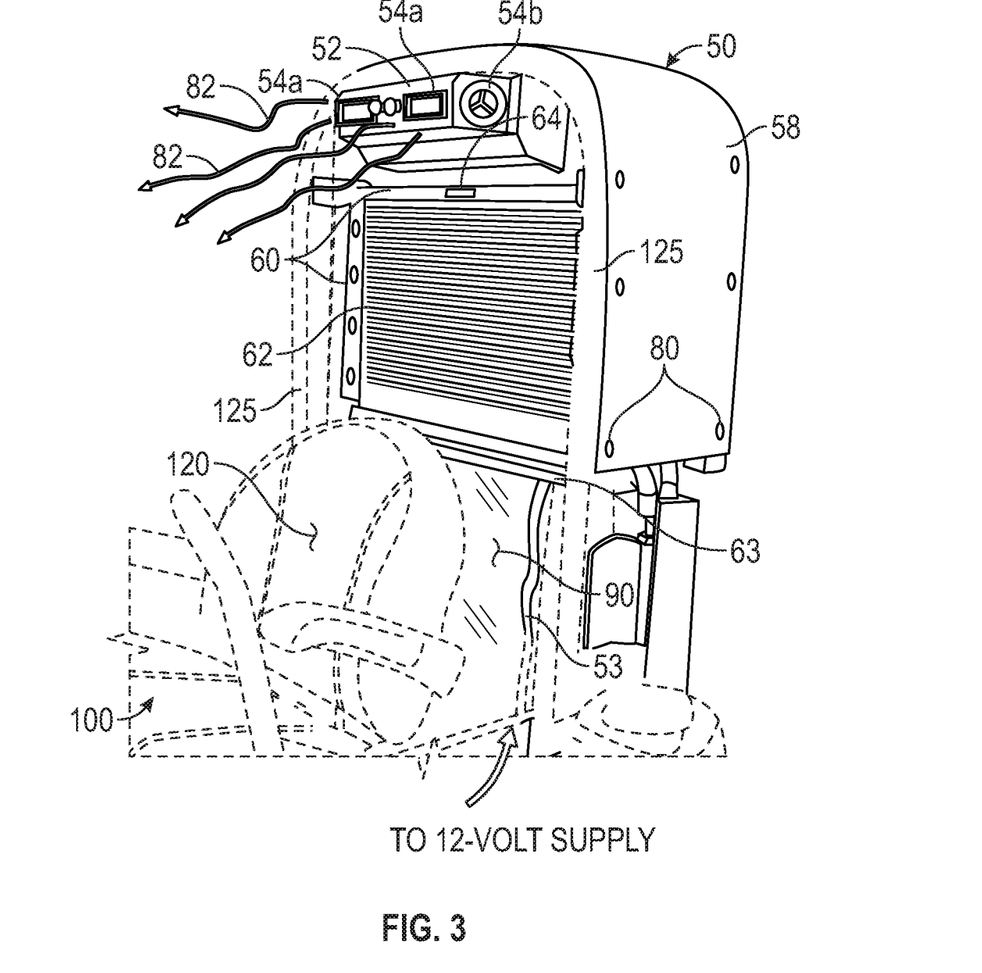
FIG. 3 is an enlarged perspective environmental view of one embodiment of the air conditioning unit of the disclosed air conditioning system for an open motorized vehicle.
Figure 4:
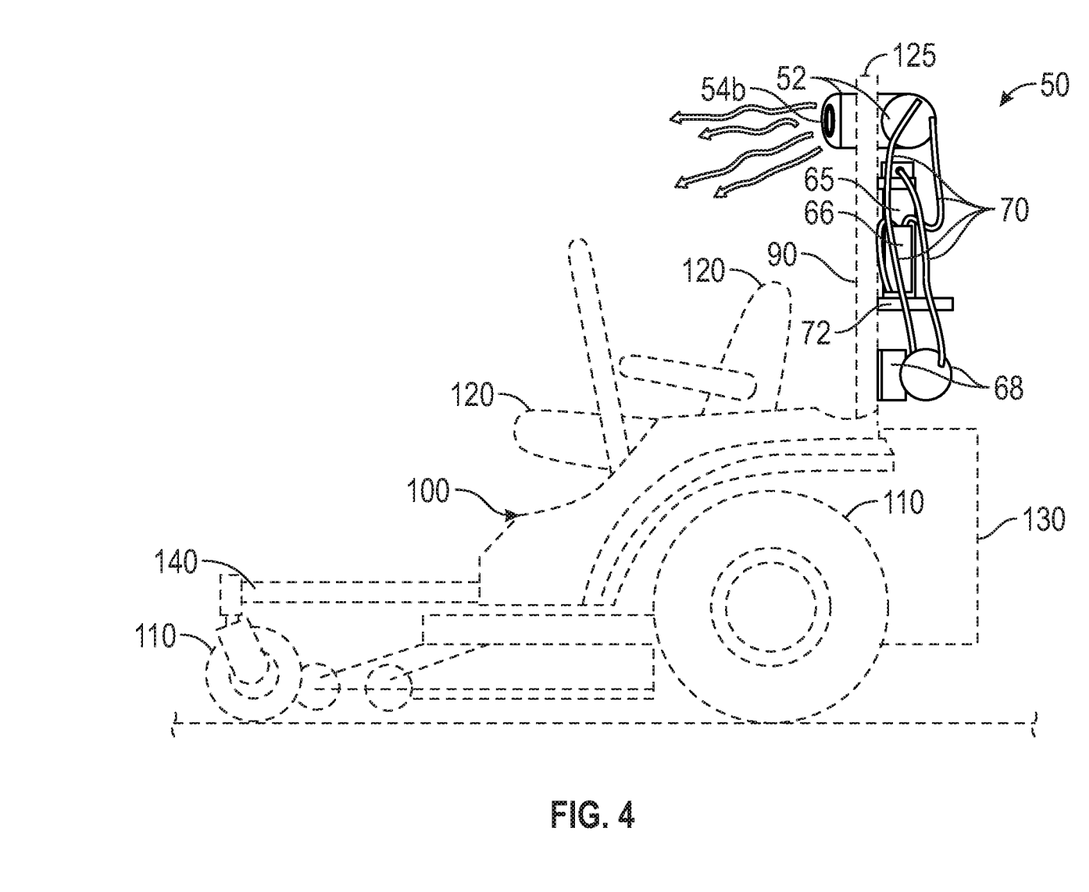
FIG. 4 is a side environmental view of the air conditioning unit of FIG. 3.

The grill 62 includes a corrugated metal sheet having a rectangular perimeter shape similar to that of the condenser 65 and is covered with fine perforations that provide coarse filtration of particulate matter from a flow of air being motioned rearwardly through the condenser 65 by the condenser fan 84 (FIG. 9). The grill 62 can be configured to provide protection and access to the condenser 65 and to remove accumulated particulate matter. Additionally, the grill 62 includes a grill hinge 63 along a bottom horizontal edge and a grill latch 64 along an upper edge, which allows the grill 62 to be tilted forward for cleaning.

The evaporator unit 52 is located subjacent to a horizontal member of the mower roll bar 125 and is attached to a bottom surface thereof using a plurality of fasteners 80. The condenser 65 is positioned below the evaporator unit 52 and is affixed to opposing vertical surfaces of the mower roll bar 125 via a condenser frame 60. The condenser frame 60 is integral to and extends outwardly from perimeter edges of the condenser 65 and is attached to opposing inner surfaces of the mower roll bar 125 using a plurality of fasteners 80. The condenser fan 84 (FIG. 9) is positioned directly behind the condenser 65 in a vertical and parallel manner and is attached to the mower roll bar 125 via a condenser fan mounting plate 86 that is attached in a similar manner as the condenser 65. The support shelf 72 is attached to the mower roll bar 125 below the condenser 65 and dryer canister 66 using fasteners 80 and is configured to provide a secure mounting surface for the drying canister 66 and any remaining related components of the air conditioning unit 50.

Figure 7:
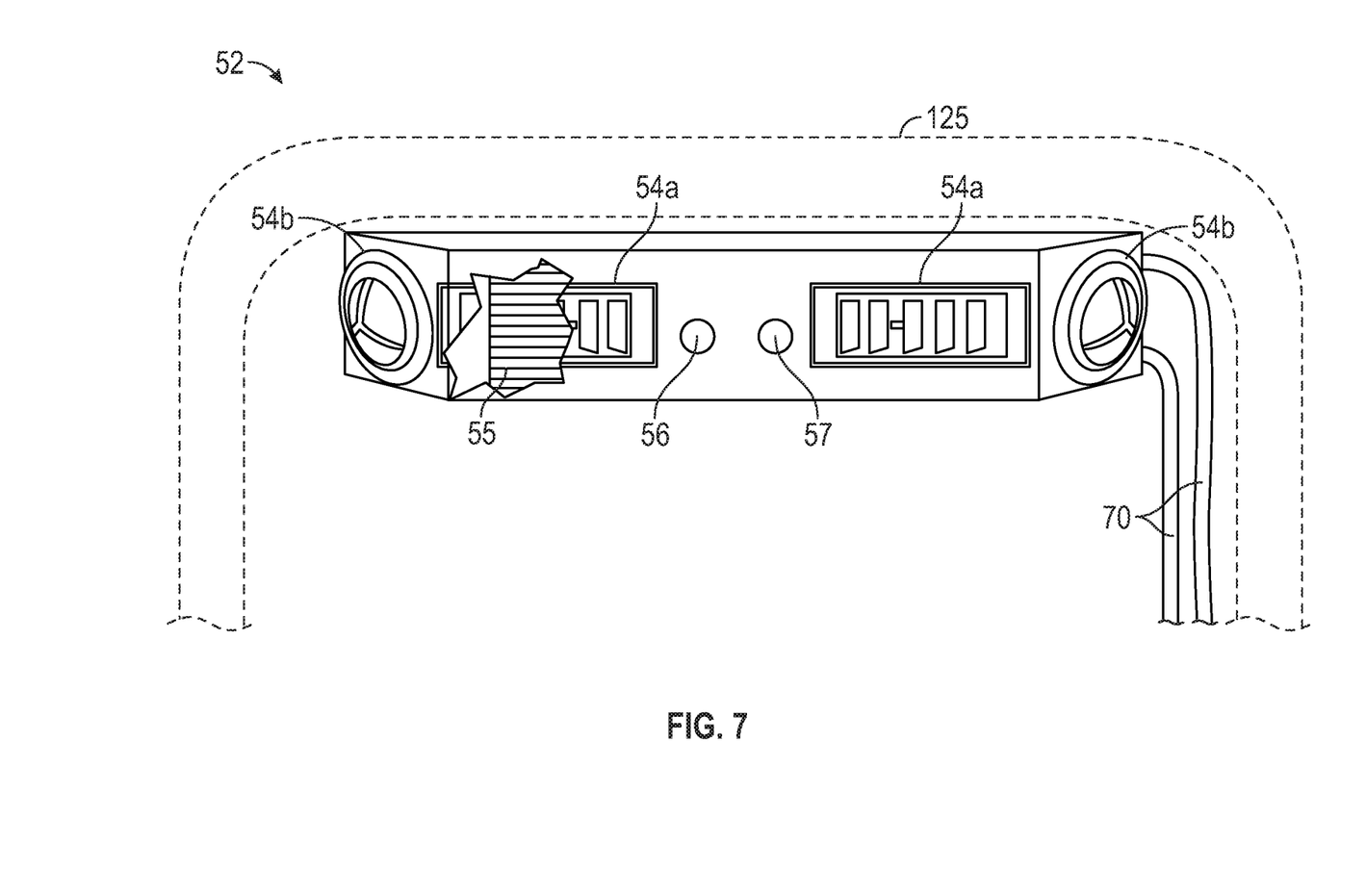
FIG. 7 is an enlarged view of the evaporator unit and controls of the disclosed air conditioning system for an open motorized vehicle.

The evaporator unit 52 receives electrical power from a 12-volt system of the lawn mower 100 via interconnecting wiring 53 used to power an internal evaporator fan 55 (FIG. 7). A flow of air is motioned rearwardly through the condenser 65 by the condenser fan 84 (FIG. 9) to cool the condenser 65. The compressor 68 includes a pulley-driven unit (e.g., substantially similar to those manufactured by the SANDEN CO.® and other manufacturers) that is powered by the engine 135 of the lawn mower 100 and is in mechanical communication therewith via an interconnecting drive belt 92.

Warm exhaust air emitted from the condenser fan 84 (FIG. 9) is isolated away from the internal occupied portion of the cab assembly 20 (FIG. 1) via an isolation panel 90 made of plastic or metal sheet material, which extends downwardly from a bottom edge of the condenser 65 and spans an opening defined by the vertical portions of the mower roll bar 125 and a floor of the lawn mower 100. The warm exhaust air is subsequently exhausted through the louvers 59 (FIG. 2b) of the rear enclosure 58, thereby maintaining a cool temperature within the user occupied area of the cab assembly 20 (FIG. 1).

Figure 6A:
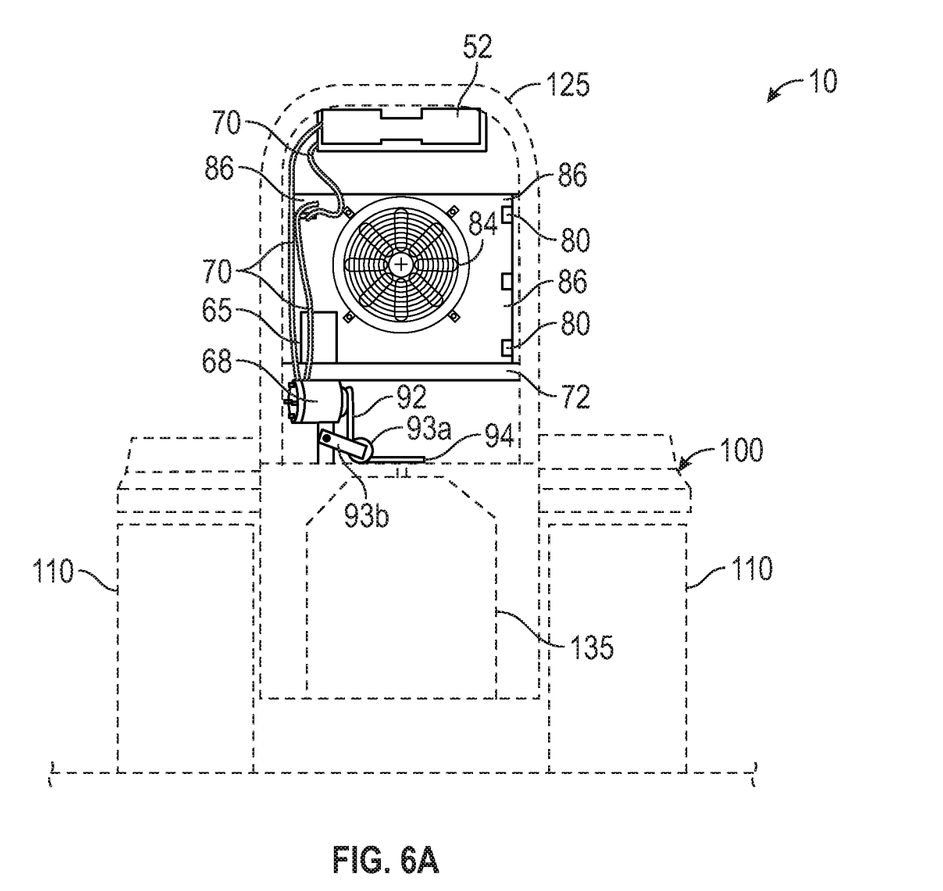
FIG. 6*a* is a rear cut-away environmental view of the air conditioning unit of FIG. 3.
Figure 6B:
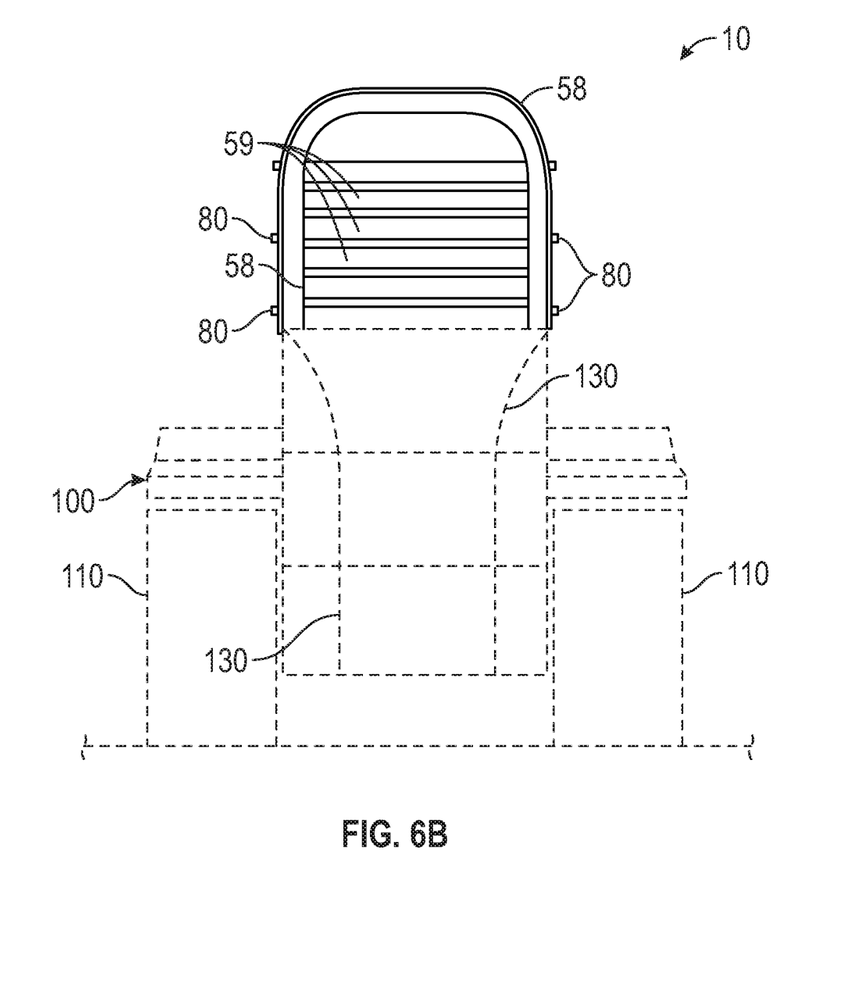
FIG. 6*b* is a rear environmental view of the disclosed air conditioning system for an open motorized vehicle depicting the louvered enclosure of the air conditioning unit.

FIG. 6b illustrates a rear view of the system 10 with an installed rear enclosure 58. Those skilled in the art will recognize that various portions of the lawn mower 100 and cab assembly 20 (FIG. 1) have been omitted for clarity sake. A rear portion of the cab assembly 20 (FIG. 1) is covered by the rear enclosure 58 having a plurality of fixed louvers 59 along a rearward-facing surface, which provide a means to exhaust the warm air from the air conditioning unit 50 (FIG. 9). The enclosure 58 includes a sheet metal or molded plastic structure mounted to outer surfaces of the mower roll bar 125 (FIG. 6a) using a plurality of fasteners 80. However, the rear enclosure 58 can be mounted to rear top and rear side portions of the upper frame 22 (FIG. 1) based upon a particular application of the system 10 or a user's preference, and as such should not be interpreted as a limiting factor of the disclosed system 10. The rear enclosure 58 can extend downwardly so that the bottom edge of the enclosure 58 is flush with an engine cover 130 of the existing lawn mower 100.

Referring now to FIG. 7, the evaporator unit 52 provides temperature and volumetric control of the cooled air 82 (FIG. 3) produced by the air conditioning unit 50 (FIG. 3). A pair of refrigeration hoses 70 connected to the evaporator unit 52 supply a flow of coolant through the evaporator unit 52 through which a flow of air is motioned by a motorized centrifugal evaporator fan 55 for conveyance into the cab assembly 20 (FIG. 1). The evaporator unit 52 includes a plastic housing that provides a mounting means to a pair of first fan vents 54a, a pair of second fan vents 54b, an internal evaporator fan 55, a fan speed knob 56 (FIG. 9), and a thermostatic temperature control knob 57. The first 54a and second 54b vents include respective rectangular and circular apertures, each further providing user-selectable air directing features to distribute the cooled air 82 (FIG. 3) throughout the cab assembly 20 (FIG. 1). The fan speed knob 56 (FIG. 9) and temperature knob 57 provide conventional fan speed control and coolant flow control, respectively, thereby providing selectable control of cooled air 82 (FIG. 3) within the cab assembly 20 (FIG. 1).

Figure 8:
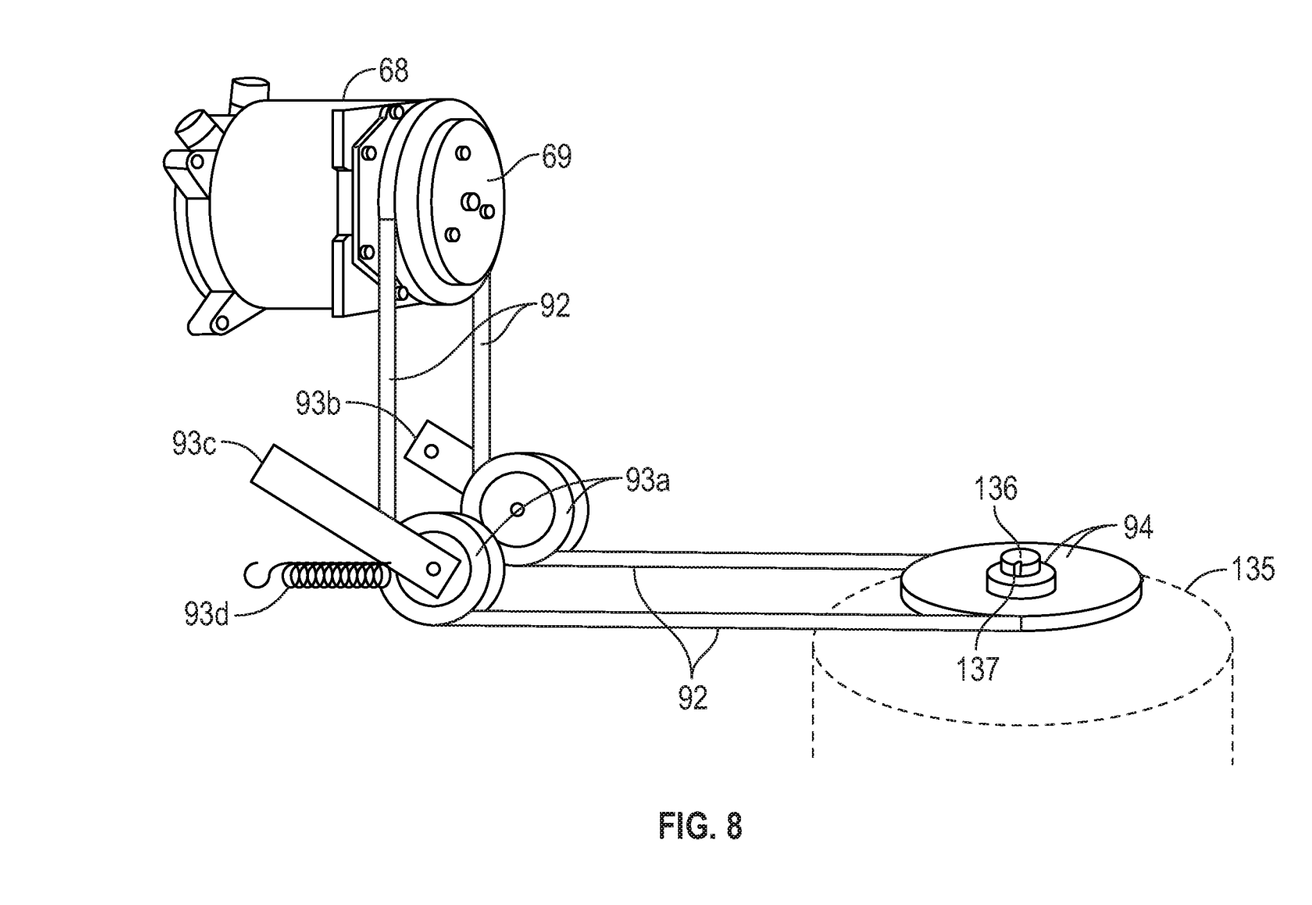
FIG. 8 is an isolated view of the compressor and drives of the engine of the disclosed air conditioning system for an open motorized vehicle.
Figure 9:
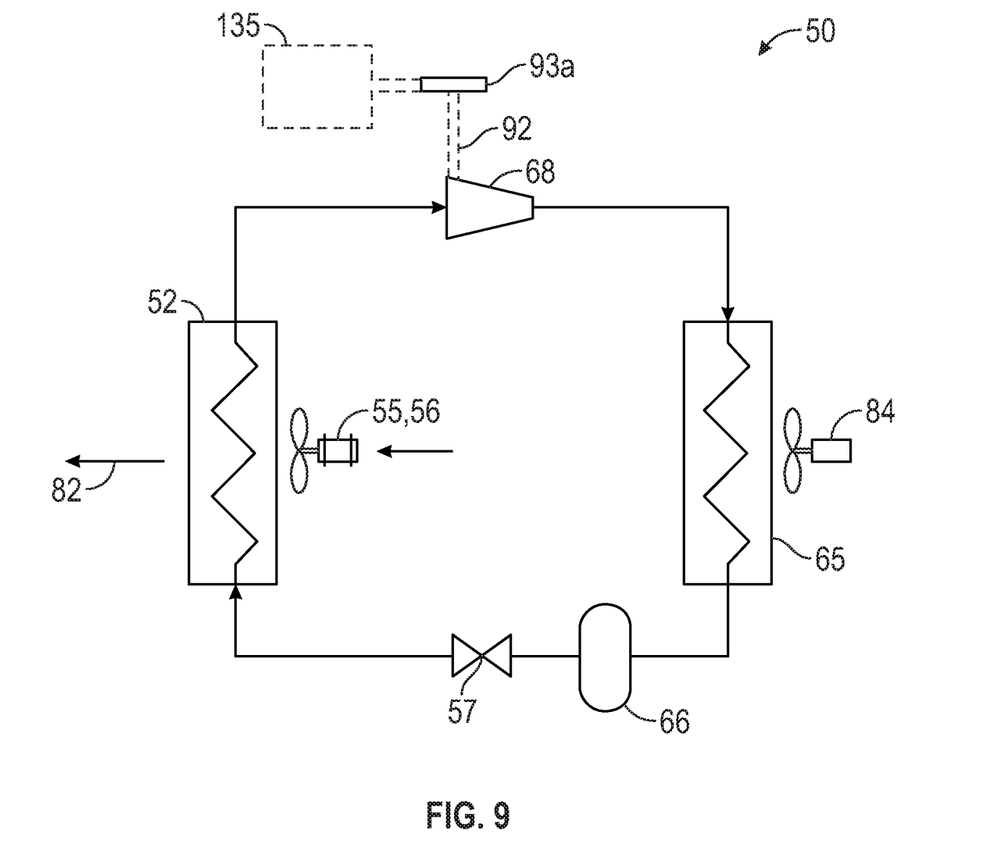
FIG. 9 is a process flow diagram of the air conditioning unit of the disclosed air conditioning system for an open motorized vehicle; and, FIG. 10 is a front view of another embodiment of the disclosed air conditioning system for an open motorized vehicle depicting the roll bar.

Referring now to FIG. 8, one (1) exemplary embodiment of the disclosed system 10 can include an integral pulley 69 of the compressor 68 being arranged at a ninety degree (90°) angle with respect to an engine pulley 94 being mounted to an output shaft 136 of the engine 135. The engine pulley 94 can be slip-fitted to the output shaft 136 using a key 137. The compressor 68 can be in mechanical communication with the engine pulley 94 via a drive belt 92 that is held in tension using a spring-type tensioning mechanism including a pair of tensioning pulleys 93a, corresponding stationary pulley arm 93b and tensioning pulley arm 93c, and a tensioning spring 93d. Those skilled in the art will appreciate that the particular example embodiment shown is for illustration and that different models and/or configurations of the system 10 can be introduced including drive components which correspond to various engine 135 arrangements without deviating from the teachings of the disclosed system 10, and as such should not be interpreted as a limiting factor of the present disclosure.

Referring now to FIG. 9, cooled air 82 (FIG. 3) is produced by the air conditioning unit 50 that includes an evaporator unit 52, an air fan 55, a fan speed controller 56, a coolant flow controller 57, a condenser 65, a dryer canister 66, a compressor 68, and a condenser fan 84. The compressor 68 receives rotating mechanical power from the engine 135 of the riding mower 100 (FIG. 1) via drive components including a drive belt 92 and corresponding tensioning pulleys 93a.

Figure 5:
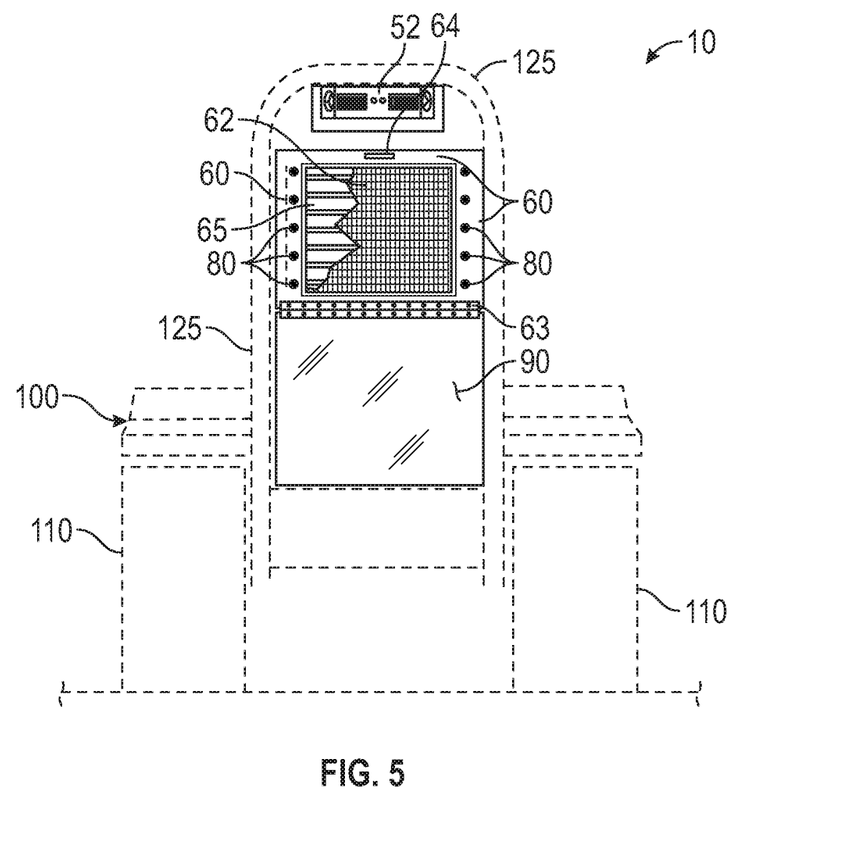
FIG. 5 is a front cut-away environmental view of the disclosed air conditioning system for an open motorized vehicle.
Figure 10:
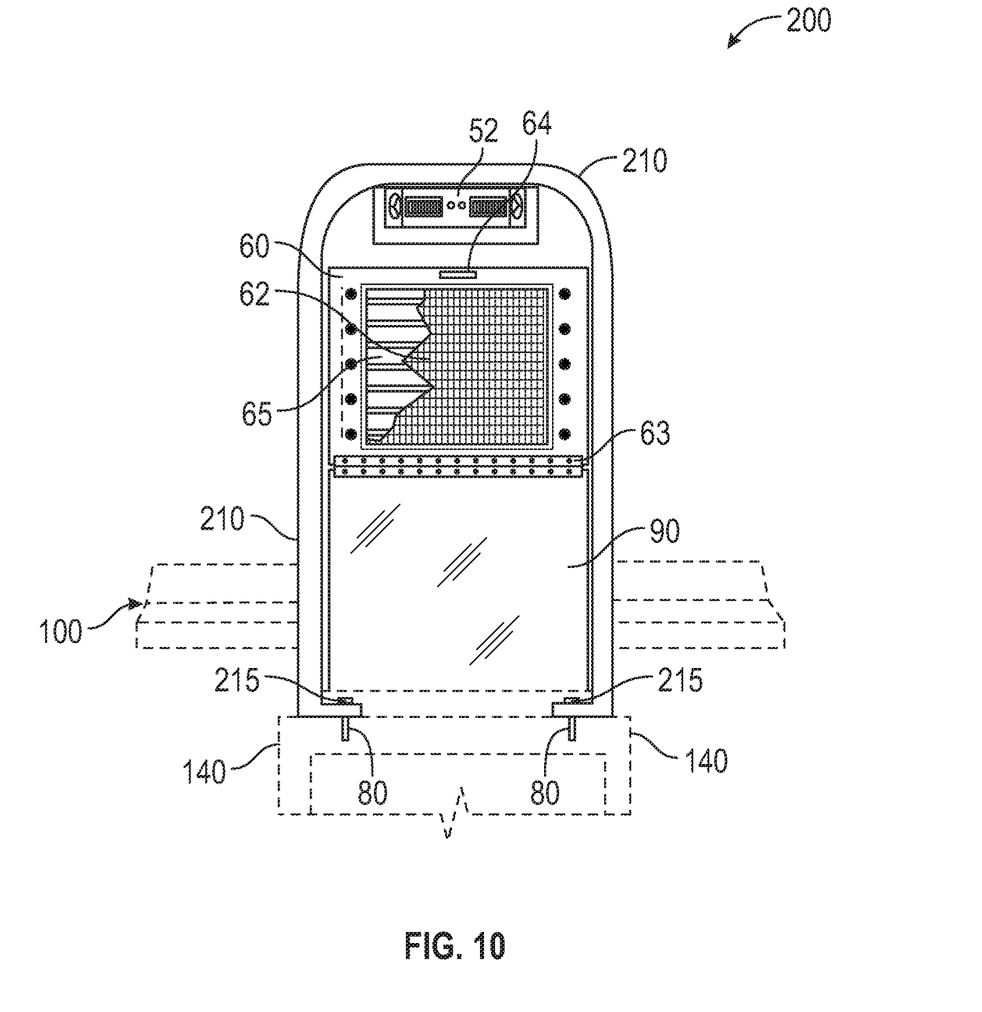

FIG. 10 illustrates a front break-away view of another embodiment of the disclosed system 200 depicting an optional roll bar 210. Those skilled in the art will recognize that various portions of the lawn mower 100 and cab assembly 20 (FIG. 1) have been omitted for clarity sake. In an event that the lawn mower 100 either does not have a mower roll bar 125 (FIG. 5) or the existing mower roll bar 125 (FIG. 5) cannot facilitate installation of the system 10, the system 200 can include a roll bar 210 being suitable in shape and safety function to facilitate attachment of the air conditioning unit 50 (FIG. 9) as described above for the disclosed system 10. The roll bar 210 can be configured to provide similar construction, function, and installation as an original-equipment mower roll bar 125 (FIG. 5). The roll bar 210 can include parallel vertical members each having an integral and perpendicularly extending welded foot plate 215 attached to frames 140 of the lawn mower 100 using suitable fasteners 80 (FIG. 5).

It is envisioned that other styles and configurations of the disclosed system 10, 200 can be easily incorporated into the teachings of the present disclosure, and only certain particular embodiments have been shown and described for purposes of clarity and disclosure and not by way of limitation of scope.

In an example implementation, the user can install and utilize the example embodiments of the system 10, 200 in a simple and straightforward manner with little or no training. After initial purchase or acquisition of the system 10, 200, it can be installed and utilized as indicated in FIGS. 1 and 6b.

An example method of installing the system 10 upon a lawn mower 100 may be achieved by performing the following steps: procuring a model of the system 10 being particularly configured for a particular existing lawn mower 100; preparing the mower roll bar 125 for installation of the air conditioning unit 50 by drilling required through-holes therethrough; attaching the evaporator unit 52, condenser frame 60, support shelf 72, condenser fan mounting plate 86, and the isolation panel 90, to the mower roll bar 125 using the drilled holes and supplied fasteners 80; mounting the grill hinge 63, the grill latch 64, the grill 62, the condenser 65, the condenser fan 84, and the dryer canister 66 to the previously installed attachment means using additional fasteners 80; installing the compressor 68, tensioning pulleys 93a, pulley arms 93b, 93c and tensioning spring 93d using provided brackets and fasteners 80 at a location suitable for routing the drive belt 92 to the engine 135 of the lawn mower 100; installing the engine pulley 94 upon an output shaft 136 of the engine 135 in a non-rotating manner using a key 137; installing the drive belt 92 upon the compressor pulley 69, the tensioning pulleys 93a, and the engine pulley 94; interconnecting the aforementioned evaporator unit 52, condenser 65, and dryer canister 66 of the air conditioning unit 50 using refrigeration hoses 70; charging the air conditioning unit 50 in accordance with a manufacturer's instructions with a refrigerant; connecting wiring 53 from the evaporator unit 52 to the 12-volt electrical system of the lawn mower 100; assembling the cab assembly 20 by joining together the upper frame 22, lower frame 40, side panels 32a, 32b, front door 24, and roof panel 25, using provided fasteners 80, if not previously assembled; preparing frames 140 of the lawn mower 100 for attachment of the cab assembly 20 by drilling a number of holes at corresponding positions; placing the cab assembly 20 upon the lawn mower 100; attaching the lower frame 40 of the cab assembly 20 to the frame 140 of the lawn mower 100 using provided fasteners 80; and, installing the rear enclosure 58 over the air conditioning unit 50 using additional fasteners 80. The system 10 is now ready to perform a mowing task.

An example method of utilizing the system 10 may be achieved by performing the following steps: swinging the front door 24 outwardly about the door hinge 26; entering the cab assembly 20 through the front door 24; sitting upon a seat 120 of the lawn mower 100 in a normal manner; shutting and securing the front door 24 using the door latch 30; starting the engine 135 of the lawn mower 100 in a normal manner; activating and adjusting fan speed and temperature of cooled air 82 emitted from vents 54a, 54b of the evaporation unit 52 using the fan control knob 56 and temperature control knob 57, as needed; and, performing normal lawn mowing tasks within a comfortable and cool environment afforded a user of the disclosed system 10.

Another example method of installing the system 200 may be achieved by performing the following steps: purchasing a model of the system 200 having a suitably sized and shaped roll bar 210; installing the roll bar 210 upon the riding mower 100 by fastening foot plates 215 of the roll bar 210 to frames 140 of the lawn mower 100 using provided fasteners 80; fastening the air conditioning unit 50 to the roll bar 210 including the evaporator unit 52, condenser frame 60, support shelf 72, condenser fan mounting plate 86, the isolation panel 90, the grill hinge 63, the grill latch 64, the grill 62, the condenser 65, the condenser fan 84, and the dryer canister 66 using supplied fasteners 80, if not pre-assembled; and, completing remaining portions of the installation of the cab assembly 20 as described above for the system 10.

Due to limited visibility behind a lawn mower 100 equipped with the system 10, 200, it can be appreciated that a user may choose to purchase and equip the lawn mower 100 with a closed-circuit rear-view system comprising a camera and a display means to further enhance visibility.

The foregoing embodiments of the disclosed air conditioning system for an open motorized vehicle have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. An enclosure system for a lawn mower, the system comprising:
    a cab assembly having a front wall, a first sidewall, a second sidewall, and a ceiling that collectively define an interior volume, wherein the cab assembly is adapted to secure to a mower frame of the lawn mower such that a user may occupy the interior volume while operating the lawn mower; and
    an air conditioning unit configured to produce conditioned air, wherein the air conditioning unit is adapted to be powered in part by rotary motion transmitted from an engine of the lawn mower, the air conditioning unit being secured in relation to the cab assembly such that conditioned air produced by the air conditioning unit is emitted directly into the interior volume,
    wherein one or more components of the air conditioning unit define a rear wall disposed opposite the front wall,
    wherein the cab assembly includes a lower frame adapted to be secured to the mower frame such that when the lower frame is secured to the mower frame the front wall is disposed in front of an operator seat of the lawn mower and the rear wall is disposed behind the operator seat, and
    wherein the cab assembly has a height that increases as the cab assembly extends from the rear wall to the front wall.

2. The system of claim 1, wherein the front wall includes a door.

3. The system of claim 1, wherein the first sidewall and the second sidewall each have a first end proximal to the front wall and a second end opposite the first end, wherein a height of the first sidewall and the second sidewall decreases as each sidewall extends from the first end to the second end.

4. The system of claim 1, wherein at least one of the first sidewall, the second sidewall, and the front wall is semi-transparent.

* * * * *